Aug. 6, 1940.   H. E. ENGELBAUGH ET AL   2,210,531
AUTOMATIC CONTROL SYSTEM FOR PIPE THREADING MACHINES AND THE LIKE
Filed Feb. 29, 1940    3 Sheets-Sheet 1

INVENTORS
Harold E. Engelbaugh,
Martin S. Gettig,
Clifton R. Coburn,
BY
ATTORNEY WITNESS
F. J. Hartman.

Patented Aug. 6, 1940

2,210,531

UNITED STATES PATENT OFFICE 2,210,531

AUTOMATIC CONTROL SYSTEM FOR PIPE THREADING MACHINES AND THE LIKE

Harold E. Engelbaugh, Youngstown, Martin S. Gettig, Poland, and Clifton R. Coburn, Youngstown, Ohio, assignors to The Youngstown Sheet and Tube Company, Youngstown, Ohio, a corporation of Ohio Application February 29, 1940, Serial No. 321,384

22 Claims. (Cl. 10—107)

This invention relates to automatic control for machines of the type used for threading or otherwise machining the ends of pipes, tubes and the like which are adapted to first machine one end of a pipe in one unit of the machine and to then transfer the pipe to another similar unit and machine the other end therein.

These units as well as the transfer mechanism interposed between them have required, prior to our invention, substantially continuous attention of operatives to insure adequate performance of the successive steps in proper sequence and at the proper times in their cycle of operations and, more particularly, one operative at a control desk or other suitable station adjacent each of the two more or less distinct units of the machine to manually operate the several controls to effect the proper movements and the threading or other machining of the pipes, whereas in accordance with our invention this work is performed entirely automatically and the operatives consequently released for other duties.

In the operation of such machines the pipes are deposited on a charging table and thereafter individually sequentially removed therefrom as determined by one of the operatives who causes them to be successively positioned for machining in coordinated timed relation with the entire cycle of operations incident to the machining of one end of each pipe by the unit which he supervises. In addition to controlling these several operations he also must see to it that each pipe, after being machined at one end, is transferred to mechanism by which it is conveyed to the other unit of the machine where another operative assumes jurisdiction over the pipe and causes it to be subjected to a substantially similar sequence of operations by the second unit to machine the other end.

To facilitate a proper understanding of our invention, we shall first describe the sequence of operations incident to the threading of a pipe at both ends by the use of a machine of this type unequipped with our control system, and therefore manually controlled by two or more operatives as hitherto mentioned, by following the progress of the pipe through the machine from the time it is placed on the skids of the charging table adjacent the first of the two threading units. These skids are so arranged as to feed the pipes by gravity to pipe lift mechanism which transfers the leading pipe from the skids to the conveyor rolls of the first unit, and to start this mechanism the operative actuates a switch, generally of the push button type, to energize its driving motor and thereby deposit the pipe on the conveyor rolls in substantial axial alignment with the adjacent threading mechanism. The operator next uses another switch to actuate the conveyor roll motor and conveyor rolls in a direction to move the pipe longitudinally into position for threading, by passing the forward end of the pipe between the jaws or grips of a pipe holding chuck. A stop is provided at a suitable limit of longitudinal movement of the pipe in this direction and as the pipe contacts this stop the operator, by means of a third switch, energizes a motor driving the pipe grips of the chuck to bring them into contact with and to then tightly embrace the pipe, so as to securely hold it against further longitudinal movement and in substantial alignment with the spindle of the threading machine; however, as the grips at this time are not rigidly clamped in the chuck housing, the grips and the pipe as a unit can move or "float" slightly transversely of the pipe axis for a purpose which will later be explained. The operator meanwhile by means of a fourth switch starts a motor which moves a traverse table carrying the threading die or other machine tool head toward the pipe; this table also carries a spindle extending through the head with a plug or dam at its leading end which enters the pipe and prevents the cutting oil from running too far into the pipe during the threading.

Automatic, i. e., non-operator-controlled, means for initiating rotation of the die head upon the attainment of a predetermined position by the traverse table and for then feeding the latter slowly forward during the threading; for arresting further forward movement of the table on its completion; for effecting a quick return of the table and for starting and stopping an oil pump so as to supply oil to the dies only when they are cutting are also normally embodied in machines of this general type but our invention is not concerned with these several mechanisms and neither their specific nature nor their mode of operation is essential for its proper comprehension.

However, when the threading of the pipe end has proceeded about 1" and the pipe is consequently accurately centered in the die head, the operator manually actuates a valve whereby compressed air is admitted into an air cylinder to operate mechanism which locks the grips against their above mentioned "floating" accommodation and the pipe and grips are thereby rigidly and positively fixed and retained in precisely coaxial relation with that head until released by a further act of the operator.

The machine continues its work upon the pipe until the thread is completed after which it automatically opens the dies mechanically and ultimately returns them to initial position during the reverse movement of the traverse table which is now initiated by the operator to restore the table to its fully retracted or starting position. During this return of the table the operator releases the pipe grip jaws by operation of the hand valve controlling the air supply to their locking cylinder and then, by operation of a switch, starts the grip driving motor in reverse direction to retract the grips radially outward and enable the pipe to be withdrawn longitudinally from the chuck by operation of another switch which energizes the conveyor roll driving motor to move the rolls in reverse direction.

After the pipe, now threaded at one end, has been withdrawn a suitable distance, usually determined by observation, the operator actuates a switch controlling kick-out mechanism, commonly interconnected with the pipe lift above described, whereby as the pipe is ejected from the conveyor by the former, another pipe may move into position for subsequent transfer thereto by the latter. The ejected pipe rolls laterally from the conveyor to a crossover table by means of which it is is fed by gravity to the second unit of the machine where another operator substantially repeats the operations just described to thread its other end.

Threading machines operating on these general principles although sometimes differing in details of construction are in common use in pipe mills and well understood by those familiar with the art, one make thereof to which our invention is particularly applicable being that known as the "Stamets threading machine"; the folowing description is therefore directed more especially to the employment of our system for the automatic control of such a machine without, however, restricting or confining its use thereto since it may readily be adapted to and utilized for the control of other machines.

It is therefore a principal object of the invention to provide an improved controlling and operating system for machines of the aforesaid general character whereby completely automatic operation may be attained.

A further object is to provide a control system of this character which is operable with pipes of different lengths.

Another object is to provide in such a control system an improved switch operating mechanism to facilitate adjustment of the machine for threading pipes of different diameters.

A still further object is the provision of an automatic control system which may be readily installed on existing, manually controlled machines without material alteration thereof yet which is equally adapted for incorporation in new machines while in process of construction.

Other objects, purposes and advantages of our invention will hereinafter more fully appear or will be understood from the following description of a preferred embodiment of it illustrated in the accompanying drawings in which.

In the several figures like characters are used to designate the same parts, and while in the drawings certain reference characters have been omitted for the sake of clearness from individual switches and contacts, it will be understood that in the following description the suffix AC applied to the character denoting a given element refers to a switch interconnected in an alternating current circuit and actuated by such element, for example, M—AC refers to the A. C. switch actuated by solenoid M. Furthermore, the suffix NOC refers to a switch contact which is normally open and the suffix NCC to one which is normally closed, the contact being adapted for operation by the element designated by the character with which the suffix is associated, "normally" here connoting a condition corresponding to that obtaining when the entire system is deenergized and there is no pipe in the machine. Thus 2FS—NOC and 2FS—NCC refer respectively to the normally open and the normally closed contacts of switch 2FS. It will also be apparent from the description that the several solenoids utilized in the system operate when energized to actuate the switches and/or contacts respectively associated with them and when deenergized allow return mechanism, such as a spring or the like (not shown in the drawings) to return them and such switches and/or contacts to normal positions.

Figure 1:
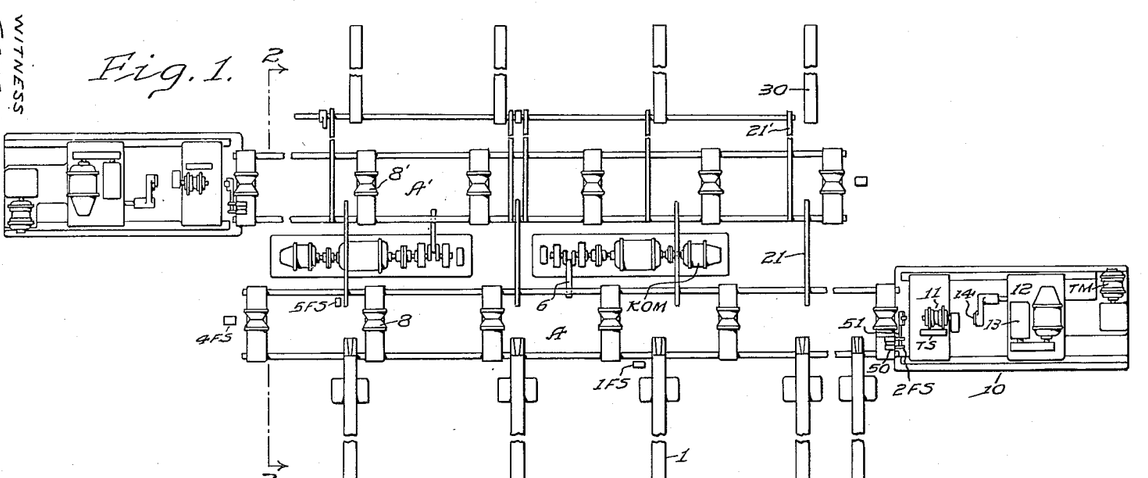
Fig. 1 is a fragmentary diagrammatic top plan view of a typical pipe threading machine adapted for control by the mechanism of our invention.
Figure 2:
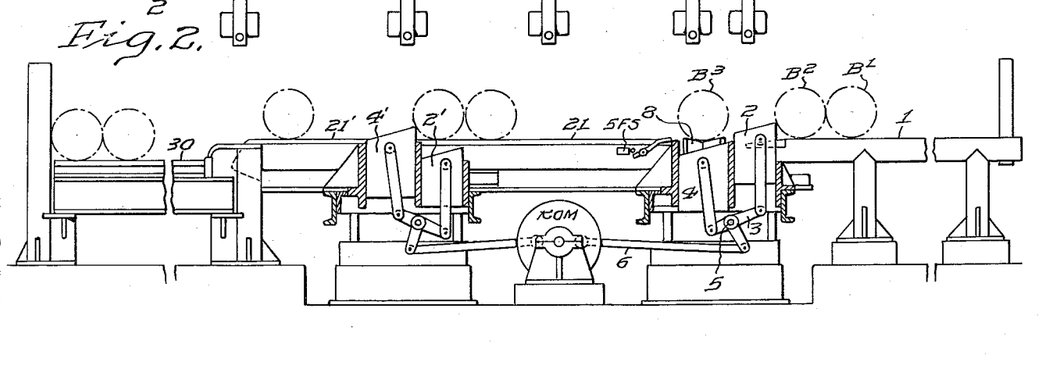
Fig. 2 is a vertical section substantially on the line 2—2 in Fig. 1 but on a larger scale.

Referring now more specifically to the construction of the machine shown in Figs. 1 and 2, its two units A, A' are structurally substantially similar to those in the manually controlled machines heretofore described and are therefore diagrammatically illustrated; the units are in general more or less distinct and are arranged side by side but reversed in position, each being adapted for threading one end of each pipe as it passes through the entire machine.

In accordance with our system, the pipe itself in its travel from the charging skids from which it enters the machine to its ultimate discharge therefrom is utilized to actuate various controls in predetermined coordinated sequence whereby, in turn, the machine is caused to automatically perform the operations requisite for positioning the pipe for threading one end, threading that end, positioning it for threading the other end, threading that end and ultimately discharging it from the machine. Therefore we shall initially describe the operative cycle of the machine with reference to the mechanical progress of a pipe therethrough and shall then further describe it with particular reference to the electrical circuits and automatic controls which, in combination with the machine itself, embody the essence of our invention whereby the various mechanical steps incident to the completion of the work upon successive pipes are automatically instituted and carried out in proper sequential and timed relation.

The unthreaded pipes B1, B2 are initially deposited upon skids 1 positioned at a slight angle to the horizontal so that they tend to roll toward the machine against longitudinally spaced vertically movable lifts 2, (now raised to the position indicated in Fig. 2) which impede their progress while a preceding pipe B3 occupies the adjacent conveyor 8 but are lowered when pipe B3 is ejected from the conveyor after the work of the unit A upon it is finished. Lifts 2 are connected by walking beams 3 with pipe kick-outs 4 and these elements are operated through a shaft 5 and pitman 6 from a kick-out motor KOM in such way that as the kick-outs are raised to eject pipe B3 from conveyor 8, the lifts are lowered to permit succeeding pipe B2 to roll toward the conveyor from the skids and thus into a position above the lifts. Thereafter when these positions of the lifts and kick-outs are again reversed through further operation of motor KOM and the kick-outs and lifts thus returned to their former positions, pipe B2 previously released by the lifts and allowed to roll over them against the now raised kick-outs is shifted by the lifts to the conveyor, succeeding pipes such as B1 being prevented by the raised lifts from rolling beyond the B2 position. As a pipe is thus transferred to conveyor 8, i. e. to the B3 position, the drive for the conveyor is energized to then feed the pipe longitudinally toward the threading mechanism, generally designated 10, adjacent one end of the conveyor and as the extremity of the pipe approaches the chuck 11 included in this mechanism, the control circuits for the conveyor motor are readjusted to reduce the conveyor speed so that the pipe end is thereafter slowly passed between the grips of the chuck toward a traverse table 12 carrying a tool head 13 which supports threading dies or other tools for machining the end of the pipe.

Operating mechanism for the chuck grips is energized to move them inwardly toward the pipe as the end of the latter engages a retractable stop 14 and during this movement of the grips the conveyor motor is deenergized thereby stopping further longitudinal movement of the pipe.

When the grips have closed tightly on the pipe, forward movement of traverse table 12 and the tool head 13 mounted thereon is initiated to move the latter to position for operating upon the pipe; during this movement of the table, stop 14 is mechanically retracted from the path of the tool head and on the ensuing return movement is restored to its original or "stopping" position. The motor TM which causes this initial relatively rapid forward movement of the traverse table is deenergized when the table reaches a predetermined point, the tool spindle and oil pump motors are energized, and the table then moves slowly ahead while the dies or cutters rotate about the pipe and progressively form the thread thereon.

The initial operation of the tool head centers the pipe with respect to the spindle, due to the floating support of the grips, and when the latter and the pipe have thus been located in precisely coaxial relation with the tool head spindle, mechanism for locking the jaws in this position is energized to hold them until the work is finished.

After the threading is completed, rotation of the tool head is arrested and the cutters open out to release the pipe; the traverse table is then retracted by reversal of the traverse table motor and the grip motor reversed to retract the grips radially from the pipe.

Upon attainment by the traverse table of its initial position, its motor is stopped and as the grips are opening the grip motor is likewise stopped and the conveyor motor started in a direction to withdraw the pipe longitudinally from the chuck. When the pipe has moved rearwardly a sufficient distance to enable it to be transferred to unit A' the conveyor motor is stopped and the kick-out and pipe lift motor again operated to raise kick-outs 4 and eject the pipe laterally onto an inclined crossover table 21 and at the same time to lower lifts 2 to permit the succeeding pipe to roll into position for subsequent transfer to conveyor 8.

The pipe, now threaded on one end, next rolls down the crossover table 21 to a conveyor 8' where similar operation of pipe lifts 2' and kick-outs 4' of unit A' of the machine initiates a cycle of operations with relation to its opposite end substantially similar to that previously carried out before ejecting it, now threaded at both ends, onto another crossover table 21' which delivers it to skids 30 where it may remain until removed by a lifting crane or in any other suitable way.

In our system of control, the attainment of automatic operation of the mechanical cycle just described is effected through the medium of electrical and other suitable instrumentalities operating in accordance with the movements of the pipe which enable the various steps to be sequentially performed in coordinated relation to its position in the machine; to these we shall now more especially refer.

Figure 3:
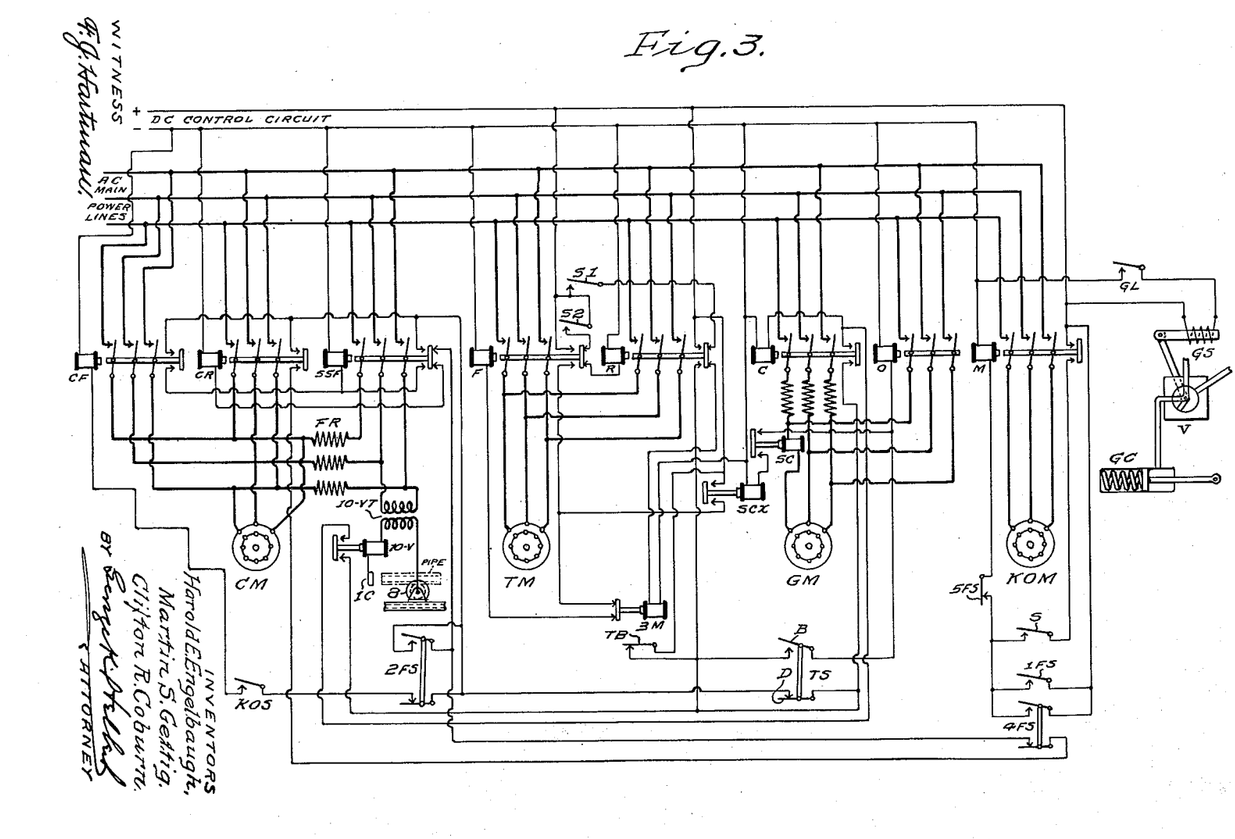
Fig. 3 is a wiring diagram of electrical circuits utilized in our control system.

The controlling circuits for unit A are shown in Fig. 3 in which they are diagrammatically illustrated in "normal," i. e. fully deenergized condition, as prior to the entrance of a pipe to the machine, and assuming now that a pipe is placed on skids 1 and allowed to roll toward and over the lowered pipe lifts 2 and against raised kick-outs 4, the pipe first engages and operates a "flag" switch 1FS as it approaches the kick-outs. The contact of this switch 1FS is connected in a D. C. control circuit, supplied with power from any suitable source, in series with a solenoid M which, upon being energized by the closing of the contact, actuates M—AC to energize the kick-out motor KOM from the A. C. main power lines and thereby shift the kick-outs 4 and pipe lifts 2 to transfer the pipe to the B3 position on the conveyor. Solenoid M also closes M—NOC to hold the solenoid circuit closed after the pipe has passed over and thereby released switch 1FS; a contact S in series with M—NOC is simultaneously mechanically closed by a cam (not shown) driven by motor KOM and is held closed thereby until crank operating pitman 6 has moved through 180° at which time S is opened, thereby deenergizing M to release M—AC and M—NOC and stop motor KOM. A contact KOS is mechanically closed by the kick-out driving mechanism at this point, that is, when lifts 2 are fully raised and kick-outs 4 fully retracted, and a D. C. control circuit through a solenoid CF is thereby established to close CF—AC and start conveyor motor CM forward at normal full speed. This control circuit may be traced through solenoid CF from the D. C. (minus) lead, now closed contact KOS, closed contact 2FS—NCC of a double pole flag switch 2FS, and closed contacts D and TB respectively to D. C. (plus). Solenoid CF, in addition to operating CF—AC for starting the conveyor motor forward at full speed, closes CF—NOC and thereby energizes another solenoid SSF from the D. C. control circuit through these same contacts D and TB. Solenoid SSF actuates SSF—AC which also connects the conveyor motor with the A. C. power lines but through resistances FR which prevent full voltage through these leads to the motor, and also operates SSF—NOC which, when closed, keeps the solenoid SSF energized after solenoid CF has been deenergized and CF—NOC therefore opened.

The pipe accordingly moves to the right in Fig. 1, at full speed on the conveyor until its leading end actuates switch 2FS to open 2FS—NCC and thereby deenergize solenoid CF and open CF—AC and CF—NOC. The conveyor motor CM remains connected with the A. C. power lines, however, through SSF—AC and resistances FR so the pipe still continues to move forward but at a slower speed as its leading end approaches and enters the grips of chuck 11.

SSF—AC being closed, current also flows through the primary winding of a 10-volt transformer 10—VT connected across two of the A. C. leads which SSF—AC controls, and as the pipe passes through the chuck grips it engages an insulated contact IC on pipe stop 14. This contact is connected in the secondary circuit of the transformer which is grounded on the conveyor, and a solenoid 10—V in the same circuit is thereby energized, closing 10—V—NOC to energize a solenoid C which operates C—AC to connect grip motor GM with the A. C. main power lines. C—NOC also closes to hold C solenoid circuit closed after 10—V has been deenergized through interruption of its circuit by the deenergization of SSF (as hereafter explained) which disconnects 10—VT from the A. C. lines. Motor GM moves the grips inwardly to bring them into engagement with the pipe and ultimately clamp them thereto, and the drive mechanism through which this movement of the grips is effected is mechanically connected with a "tandem switch" TS which operates shortly after solenoid C is energized, this switch comprising a pair of contacts B and D which are linked together as hereinafter described.

Thus the operation of the grip drive opens contact D which interrupts the circuit through solenoid SSF and releases SSF—AC to stop the conveyor motor, and likewise closes contact B to enable subsequent establishment of circuits therethrough which are essential to completion of the cycle. Then when the pipe impedes further closing movement of the grips, motor GM draws a heavier load from the A. C. main power lines and thereby energizes a solenoid SC in one of the grip motor leads sufficiently for it to close SC—NOC and complete a circuit through a solenoid SCX and contact B. Solenoid SCX thereupon closes SCX—NOC to energize a solenoid F through 3M—NCC, and solenoid F then acts to close F—AC and energize traverse table motor TM to start the traverse table moving toward the now stationary pipe, solenoid F during this movement maintaining its own energizing circuit through F—NOC and 3M—NCC.

The closing of contact B also energizes a solenoid O through contact TB but this solenoid is equipped with a mechanical interlock (not shown) controlled by solenoid C which is now energized, and this lock is therefore effective to prevent solenoid O from closing O—AC whenever solenoid C is energized. The function of solenoid O and of O—AC will hereinafter appear.

As the traverse table moves forward it also opens contact TB and thereby interrupts the O and SCX solenoid circuits, but none of these circuits directly affects the operation of the machine at this time. The opening of TB also interrupts C solenoid circuit, releasing C—AC to deenergize the grip motor GM, but the pipe remains firmly held in the grips by the worm driving gearing through which they are actuated.

After the traverse table has been brought to the point at which work upon the pipe is to be initiated, it closes a contact S1 to energize solenoid 3M and thereby open 3M—NCC and interrupt F solenoid circuit, releasing F—AC to stop the traverse motor TM. Solenoid 3M also controls the usual contacts (not shown) in the circuits which cause the spindle motor and oil pump motor to be energized to initiate their working cycles in the manner in which they normally operate in a machine not equipped with our invention and of which said contacts and circuits do not form a part.

The rotation of the die head and ensuing slow forward movement of the traverse table induced by the table feed mechanism which functions during the threading in the ordinary way cause the pipe to become accurately centered with respect to the spindle axis and after the table has moved a short distance forward it operates a contact GL which energizes a solenoid GS mechanically controlling an air valve V whereby air under pressure is supplied to a fluid cylinder GC to actuate a mechanical lock (not shown) which inhibits further "floating" of the grips so the pipe is held accurately centered until the threading is finished.

The die head completes its work and then automatically disengages its cutters from the pipe in the usual way; simultaneously a contact S2 is actuated by the die head or other suitable part associated with the traverse table to complete a circuit through a solenoid R and F—NCC, solenoid F being deenergized, thereby closing R—AC to start the traverse table motor in reverse and opening R—NCC and closing R—NOC; other instrumentalities (not shown) for stopping the spindle and oil pump motors are similarly operated at this time.

The opening of R—NCC deenergizes 3M and allows 3M—NCC to close, but as SCX has been previously deenergized and SCX—NOC is open, closing of 3M—NCC does not complete the F solenoid circuit.

The closing of R—NOC, however, energizes solenoid O through the now closed contact B and closes O—AC since solenoid C, controlling the mechanical interlock, is now deenergized; this starts grip motor GM in reverse direction to retract the grips and release the pipe from the chuck.

As the traverse table moves back it opens contacts S1 which prevents solenoid 3M from being energized upon closing of R—NCC when solenoid R is subsequently deenergized and opens contact GL to deenergize solenoid GS and thereby release the fluid pressure from cylinder GC and free the mechanism locking the grips in the chuck; the moving table also closes contact TB and is effective through suitable mechanism (not shown) to reset the die head which operation, in turn, opens contact S2 as the table attains its original or normal position and so brings it to rest by deenergizing solenoid R to open R—AC and deenergize traverse motor TM. The chuck grips, however, may continue to move outwardly after R is so deenergized if solenoid O circuit is maintained through contact TB.

When the pipe has been fully released from the grips tandem switch TS is actuated from its mechanical interconnection with the grip drive, and the consequent opening of contact B deenergizes solenoid O to interrupt the grip motor reverse drive while the closing of contact D energizes a solenoid CR through SSF—NCC, 2FS—NOC and contact TB, thereby closing CR—AC to drive the conveyor motor in reverse direction and also closing CR—NOC to keep solenoid CR energized through SSF—NCC, 4FS—NCC, D and TB after the pipe clears 2FS and allows 2FS—NOC to open, the release of this switch by the pipe also closing 2FS—NCC.

The reverse drive of conveyor motor CM and hence of the conveyor rolls withdraws the pipe from the chuck and moves it rearwardly along the conveyor after clearing 2FS until its remote end engages another flag switch 4FS to open 4FS—NCC, thus deenergizing solenoid CR and allowing CR—AC to open and stop the conveyor motor.

The simultaneous closing of 4FS—NOC energizes solenoid M to close M—AC and start the kick-out motor KOM, which moves lifts 2 and kick-outs 4 through another half-cycle to eject the pipe, now threaded on one end, from the conveyor onto the crossover table 21.

As the pipe moves away from conveyor 8 a succeeding one rolls down skids 1 to a position above lifts 2 and actuates switch 1FS to initiate another cycle, the ejection of the preceding pipe allowing switch 4FS to return to its normal position. If no succeeding pipe is in position such that it can thus actuate switch 1FS, the circuit through solenoid M is interrupted by release of switch 4FS upon completion of the 180° half-cycle of the kick-out and pipe lift mechanism essential to fully eject the preceding pipe and the first unit of the machine therefore remains deenergized.

The control circuits and mechanical elements embodied in the other unit A' of the machine are desirably the same as those hereinabove described except for reversal of their positions since they operate upon the other end of the pipe; detailed reference to them is therefore not required as it would be a repetition in substance of what has already been said. However, these control circuits and mechanical elements are preferably so arranged as to operate the second unit A' at a rate about the same as that of the first unit A so that neither an excessive number of pipes will accumulate on the skids of crossover table 21 through too rapid operation of A nor will A' be kept waiting for a pipe because of too slow operation of A.

In order to positively prevent overcrowding of crossover 21, we preferably dispose a flag switch 5FS in its proximity so it will be opened by the pipes if an excessive number of them accumulate on the crossover; its contact is interposed in the circuit controlling solenoid M so the latter cannot be energized to initiate a new cycle in unit A when table 21 is full and 5FS open. Unit A is thus kept deenergized until A' removes the excess pipes from table 21 and allows 5FS to close.

Figure 4:
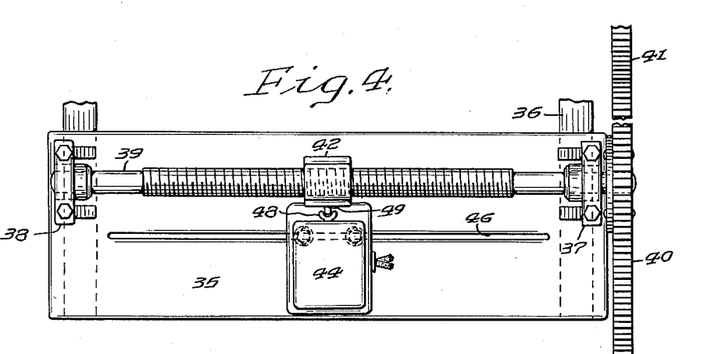
Fig. 4 is an enlarged top plan detail of one of the switches, hereinafter termed the "tandem switch" embodied in the system.
Figure 5:
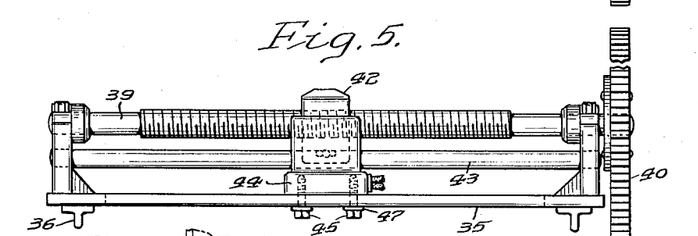
Fig. 5 is a side elevation thereof.

The tandem switch TS which we prefer to employ for controlling contacts B and D is illustrated in Figs. 4 and 5, although any other suitable device may be utilized instead for actuating the contacts in one direction while the grips are closing and in the opposite direction while they are opening. However, as contact B controls the extent to which the grips are opened out from their pipe-engaging position, it is desirable in the interests of maximum production that the switch be capable of adjustment with relation to the diameter of the pipe threaded to the end that the grips will not be retracted from the pipe farther than necessary to allow it to be withdrawn from the chuck and the succeeding pipe entered therein instead of being moved out to their maximum extent during each cycle, and the aforesaid switch adequately fulfills this requirement.

The switch proper and the mechanism we have devised for operating it is designed to be mounted on the housing of chuck 11 or some other convenient part of the machine where it may be mechanically interconnected with the grip drive; it comprises a plate 35, supported from brackets 36, with bearings 37 and 38 at its extremities for a threaded shaft 39 which has on one end projecting beyond bearing 37 a micarta or other suitable gear 40 meshing with another similar gear 41 on a shaft (not shown) forming part of the grip drive and driven from the grip driving motor GM; the threaded shaft 39 therefore rotates in one direction or the other depending upon the direction of movement of the grip drive and in direct ratio to the extent of movement of the grips. The shaft carries an internally threaded nut 42 having a notch in its lower edge slidingly engaging a fixed rod 43 to keep it from rotating with the shaft so that the nut travels along the shaft in correspondence with the movement of the grips.

A switch housing 44 containing contacts B and D is seated on plate 35 and adjustably secured thereto by screws 45 extending through a slot 46 paralleling the shaft and carrying washers 47 which are clamped by the screws against the under side of the plate to hold the switch housing in the desired longitudinally adjusted position on the plate.

The contacts B and D contained in this housing 44 are arranged to be actuated substantially simultaneously in opposite directions through the instrumentality of a forked lever 48 projecting from the housing into the path of a dog 49 on nut 42 so as the latter moves along the threaded shaft during the opening or closing of the grips the dog shifts the lever, and thus the switch contacts, in one direction or the other depending on the direction of the grip drive and at a time with relation to the then position of the grips determined by the adjusted position of the housing.

Figure 6:
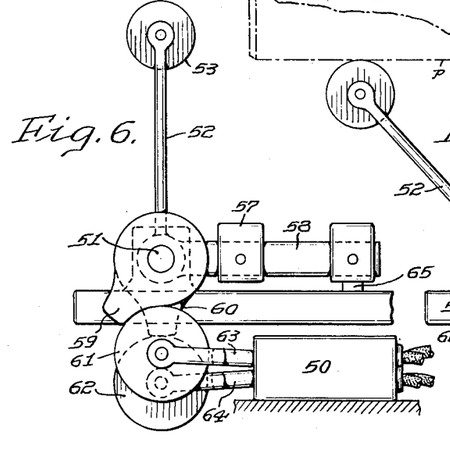
Fig. 6 is an enlarged side elevational detail of another type of switch also employed therein with its operating mechanism in normal position.
Figure 7:
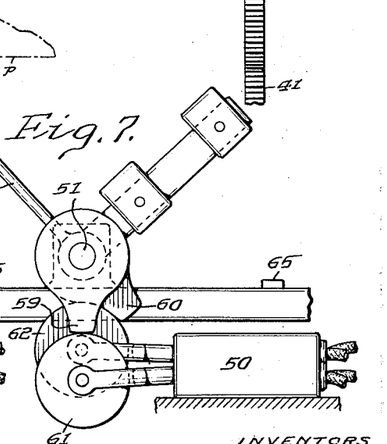
Fig. 7 is a similar view thereof in another position showing how the switch is actuated by the pipe.

Flag switches 1FS, 2FS, etc. may also be of any design suitable for operating the circuits they respectively control in response to movement of the pipe, and we have shown in Figs. 6 and 7 and shall now more particularly describe as illustrative of a type we prefer to employ for the purpose the switch 2FS. This switch comprises a pair of contacts 2FS—NOC and 2FS—NCC (not shown), the first of which is open and the other closed when the switch is in normal position as shown in Fig. 6; the contact positions are reversed, however, when the switch is in the condition shown in Fig. 7 as a result of its having been actuated by a pipe $p$ in passing over it. The operating mechanism for the contacts, which are enclosed in a housing 50 disposed adjacent and to one side of the end of the conveyor nearest the traverse table, comprises a shaft 51 extending across but below the level of the path of pipe $p$ on the conveyor and between it and the chuck. This shaft supports an upstanding flag arm 52 on the upper end of which is mounted a roller 53 projecting into the path of the pipe and adapted to be engaged and depressed by its end as it moves along the conveyor toward the chuck, i. e. toward the left in Fig. 6, while an adjustable counterweight 57 on an arm 58 secured to the shaft returns the latter to normal position upon release of the roller when the pipe is retracted. The shaft carries at its end adjacent housing 50 a pair of cams 59 and 60 respectively adapted to engage subjacent rollers 61, 62 on arms 63, 64 extending into the housing and in turn respectively operating the switch contacts therein when shifted vertically in one direction by the appropriate cam and in the other by internal spring mechanism, counterweight or other return device (not shown). Since 2FS has one normally open and one normally closed contact, the cams 59, 60 are so arranged that switch arms 63, 64 are alternately operated in opposite directions when shaft 51 is moved through a partial revolution by engagement of the moving pipe with roller 53 or by the action of the counterweight when the pipe is clear of the roller, a stop 65 limiting the return movement.

It will of course be understood that flag switches such as IFS and 5FS having but one contact comprise but a single cam for actuating it when the flag arm is moved by the pipe.

Specific description of the switches of which contacts S, KOS, S1, S2 and TB shown in Fig. 3 are comprised would be superfluous as they are merely single pole mechanically actuated switches of any suitable character adapted, as herein explained, for operation by the kick-out mechanism or the traverse table as the case may be.

As will be now apparent from the foregoing description, a machine comprising our control system is adapted to automatically and sequentially thread or otherwise machine both ends of each of a continuous or intermittent series of pipes, tubes or the like without external assistance or attention, it being only necessary to keep skids 1 supplied with unthreaded pipes and to remove them after threading from skids 30. Moreover, the end of each successive pipe is moved into exactly the same relation to the tool head preparatory to machining so that each is operated upon by the head in exactly the same manner as the others even though they be initially disposed in random positions on skids 1 or be of assorted lengths; our invention therefore results in substantial elimination of damage to the pipe ends and/or threading dies or cutters such as sometimes occurs in like machines operated by hand controls because the operatives through carelessness, fatigue, lack of skill or other reasons, allow the pipes and dies to contact each other too forcibly. Furthermore, since the pipes automatically succeed each other in their progress through the machine as rapidly as they can be machined thereby, interruptions and delays are eliminated and the volume of production correspondingly increased.

As we have stated, our invention is of particular adaptability to incorporation in and control of pipe threading machines of the general character exemplified by that commercially known as the "Stamets" machine and we have therefore explained it herein more especially with reference to such a machine but without in any way intending to thereby restrict its application and use thereto, since our system may be employed with equal facility and advantage for the automatic control of machines of generally similar type adapted to perform operations other than threading upon the ends of pipes or the like as well as of machines of different type designed for threading or otherwise machining pipes and other articles.

Moreover, the principles of operation of our invention as well as the specific instrumentalities and the arrangement thereof utilized in their application are susceptible of modification in many ways within the scope of the appended claims either to adapt the system to the control of machines of differing construction or for other reasons, and we do not therefore limit or confine ourselves in the practice of the invention to the employment and/or disposition of the particular ones to which we have herein referred.

Having thus described our invention, we claim and desire to protect by Letters Patent of the United States:

1. In a machine of the class described comprising supporting means for a series of cylindrical work pieces, a conveyor adapted to receive from said means and impart axial movement to one of said pieces, means for transferring the leading piece in said series thereto, work holding means proximate one end of the conveyor, a movable traverse table on the opposite side of the holding means, means carried by the table for machining the proximate end of the work while held by the holding means and arranged for automatic disengagement from the work on completion of the machining, and means for discharging the machined piece from the conveyor after withdrawal thereby from the holding means, the combination of means actuated by movement of successive work pieces along the supporting means for causing the transfer means to sequentially transfer the leading piece to the conveyor, means adapted upon said transfer to cause the conveyor to move such piece into the holding means, means actuated by the piece when it attains a predetermined position to close the holding means against it, means responsive to the operation of the holding means to stop the conveyor and to move the traverse table toward the piece, means responsive to the movement of the table to stop it at a predetermined point and to actuate the machining means, means operative upon completion of the machining to return the table to initial position, means operated by the return movement of the table to open the holding means, means responsive to the opening movement of the holding means to cause the conveyor to retract the work piece therefrom, and means operated by the piece when it attains a predetermined position to effect its discharge from the conveyor.

2. In a machine of the class described comprising supporting means for a series of cylindrical work pieces, a conveyor adapted to receive from said means and impart axial movement to one of said pieces, means for transferring the leading piece in said series thereto, a chuck proximate one end of the conveyor, a movable traverse table on the opposite side of the chuck, means carried by the table for machining the proximate end of the work while held by the chuck and arranged for automatic disengagement from the work on completion of the machining, and means for discharging the machined piece from the conveyor after withdrawal thereby from the chuck, the combination of electrically operated means actuated by movement of successive work pieces along the supporting means for causing the transfer means to sequentially transfer the leading piece to the conveyor, electrically operated means adapted upon said transfer to cause the conveyor to move such piece into the chuck, electrically operated means, including a circuit closed by the piece when it attains a predetermined position, operative to close the chuck against it, electrically operated means responsive to the operation of the chuck to stop the conveyor and to move the traverse table toward the piece, electrically operated means responsive to the movement of the table to stop it at a predetermined point and to actuate the machining means, electrically operated means responsive to the operation of the machining means to interrupt their operation on completion of their work and to return the table to initial position, electrically operated means actuated by the return movement of the table to open the chuck, electrically operated means responsive to the opening movement of the chuck to cause the conveyor to retract the work piece therefrom and electrically operated means actuated by the piece when it attains a predetermined position to effect its discharge from the conveyor.

3. A machine as specified in claim 1 in which the means for closing the holding means includes a transformer having a primary circuit energized from the conveyor moving means and a secondary circuit in which the work constitutes a conductor.

4. A machine as specified in claim 1 in which the means for closing the holding means includes a motor and an energizing circuit therefor, and the traverse table moving means includes switch means responsive to overloading of said energizing circuit and non-responsive to normal load of said circuit during closing of said holding means prior to the actual gripping of the work.

5. A machine as specified in claim 1 in which the holding means includes a housing and jaws movable radially inward toward the work and adapted for movement as a unit with the work after engagement therewith and traverse table actuated means for then locking the jaws in fixed position in the housing during operation of the machining means thereon.

6. A machine as specified in claim 1 in which the holding means includes a housing and jaws movable radially inward toward the work and adapted for movement as a unit with the work after engagement therewith and means for then locking the jaws relatively to the housing including a fluid actuated piston and an electrically operated fluid control valve actuated by movement of the traverse table.

7. A machine as specified in claim 1 in which the means for operating the conveyor include a motor having two energizing circuits in electrical parallel, one having an interposed resistance whereby when both circuits are closed the conveyor operates at relatively high speed and when said one circuit is closed and the other circuit is opened it operates at relatively low speed.

8. A machine as specified in claim 1 in which the means for operating the conveyor include a motor having two energizing circuits in electrical parallel, one having an interposed resistance whereby when both circuits are closed the conveyor operates at relatively high speed and when said one circuit is closed and the other circuit is opened it operates at relatively low speed, said other circuit including means responsive to the closing thereof for energizing the circuit comprising said interposed resistance.

9. A machine as specified in claim 1 in which the means for operating the conveyor include a motor having low speed and high speed circuits in electrical parallel, the low speed circuit having an interposed resistance whereby when both circuits are closed the conveyor operates at relatively high speed and when the low speed circuit is closed and the high speed circuit is opened the motor operates at relatively low speed, means for respectively closing said circuits, the means for closing said low speed circuit being self-maintaining and the means for closing the high speed circuit including means for initially energizing said low speed circuit closing means, whereby when the high speed circuit is closed the low speed circuit is also closed and is adapted to remain closed after the high speed circuit has been interrupted.

10. In a machine of the class described comprising a chuck including movable grips adapted to embrace an elongated work piece and a driving motor therefor, a traverse table movable relatively to the chuck including a tool for machining the end of the work piece and a motor for moving the table, means actuated from the energizing circuit of the grip driving motor adapted when the grips engage a work piece in the chuck to energize the traverse table motor to move the table toward the chuck.

11. In a machine of the class described comprising a chuck including movable grips adapted to embrace an elongated work piece and a driving motor therefor, a traverse table movable relatively to the chuck including a tool for machining the end of the work piece and a motor for moving the table, a solenoid in series with the grip driving motor responsive to an overload thereon and non-responsive to the normal load while the grips are moving inwardly toward the work, and means actuated by the solenoid for energizing the traverse table motor to move the table toward the chuck.

12. In a machine of the class described comprising a chuck including movable grips adapted to embrace an elongated work piece and a driving motor therefor, a traverse table movable relatively to the chuck including a tool for machining the end of the work piece and a motor for moving the table, a solenoid in series with the grip driving motor responsive to an overload thereon and non-responsive to the normal load while the grips are moving inwardly toward the work, means actuated by the solenoid for energizing the traverse table motor to move the table toward the chuck, and means responsive to movement of the table toward the chuck for interrupting the grip driving motor circuit.

13. In a machine of the class described comprising a conveyor for an elongated work piece, a driving motor therefor, a chuck disposed adjacent one end of the conveyor comprising radially inwardly movable grips adapted to embrace a work piece introduced thereto by the conveyor and a driving motor for the grips, means for energizing the grip driving motor to move the grips inwardly toward a work piece after the conveyor has entered such work piece into the chuck, and means actuated by the grip driving motor for deenergizing the conveyor motor during said movement of the grips.

14. In a machine of the class described comprising a conveyor for an elongated work piece, a driving motor therefor, a chuck disposed adjacent one end of the conveyor comprising radially inwardly movable grips adapted to embrace a work piece introduced thereto by the conveyor and a driving motor for the grips, a transformer having its primary winding in series with the conveyor motor, a normally open circuit including in series the conveyor, the secondary winding of the transformer, a solenoid and a contact element adapted for engagement by a work piece when moved by the conveyor to a predetermined position to thereby close the circuit and energize the solenoid from said secondary winding, a normally open energizing circuit for the grip driving motor and solenoid-actuated means operative to close the energizing circuit when said solenoid is energized.

15. In a machine of the class described comprising a conveyor for an elongated work piece, a driving motor therefor, a chuck disposed adjacent one end of the conveyor and comprising radially inwardly movable grips adapted to embrace a work piece introduced thereto by the conveyor and a driving motor for the grips, means actuated through the work piece when moved to a predetermined position by the conveyor for energizing the grip driving motor and means actuated by the grip driving motor for deenergizing the conveyor motor during movement of the grips inwardly toward the work piece.

16. In a machine of the class described comprising a conveyor for an elongated work piece, a driving motor therefor, a chuck disposed adjacent one end of the conveyor comprising radially inwardly movable grips adapted to embrace a work piece introduced thereto by the conveyor, means for energizing the conveyor motor to move a work piece on the conveyor at a predetermined speed toward the chuck, and means adapted when engaged by the work piece during said movement to reduce the speed of the conveyor motor.

17. In a machine of the class described comprising a conveyor for an elongated work piece, a driving motor therefor, a chuck disposed adjacent one end of the conveyor comprising radially inwardly movable grips adapted to embrace a work piece introduced thereto by the conveyor and a driving motor for the grips, means for energizing the conveyor motor to move a work piece on the conveyor toward the chuck at a predetermined speed, means engageable by the work piece during said movement adapted to reduce the speed of the conveyor motor as the work piece is introduced to the chuck, and means engageable thereafter by the work piece for energizing the grip motor to move the grips inwardly.

18. In a machine of the class described comprising a conveyor for an elongated work piece, a driving motor therefor, a chuck disposed adjacent one end of the conveyor comprising radially inwardly movable grips adapted to embrace a work piece introduced thereto by the conveyor and a driving motor for the grips, means for energizing the conveyor motor to move a work piece on the conveyor toward the chuck at a predetermined speed, means engageable by the work piece during said movement adapted to reduce the speed of the conveyor motor as the work piece is introduced to the chuck, a contact engageable by the work piece during said last mentioned movement, a solenoid in series with the contact and work piece energized upon said engagement, and means actuated by the solenoid for energizing the grip motor.

19. In a machine of the class described comprising a chuck including movable grips adapted to embrace a work piece, a conveyor for introducing a work piece thereto and driving motors for the grips and conveyor respectively, means engageable by the work piece for energizing the grip motor after said work piece has been introduced by the conveyor to the chuck, a threaded shaft driven from the grip motor, a nut movable on the shaft in correspondence with its rotation, and a switch actuated by the nut operative to deenergize the conveyor motor during movement of the grips inwardly toward the work piece.

20. In a machine of the class described comprising a chuck including movable grips adapted to embrace a work piece, a conveyor for introducing a work piece thereto, a movable traverse table supporting means for machining the work piece when embraced by the grips and driving motors for the grips, conveyor and table respectively, means engageable by the work piece when introduced to the chuck by the conveyor for energizing the grip driving motor, means driven from said motor operable during movement of the grips toward the work piece for deenergizing the conveyor motor, and means responsive to an overload on the grip motor as the grips thereafter embrace the work piece for energizing the traverse table motor to move the table toward the chuck.

21. In a machine of the class described, a chuck comprising movable grips and a driving motor therefor, a control switch having a normally open and a normally closed contact, a lever movable in opposite directions for simultaneously actuating said contacts, a threaded shaft disposed adjacent the lever and driven from said motor, and a nut movable along the shaft in response to its rotation and adapted to actuate the lever in correspondence with the movements of the grips.

22. In a machine of the class described, a chuck comprising movable grips and a driving motor therefor, a control switch having a normally open and a normally closed contact, a lever movable in opposite directions for simultaneously actuating said contacts, a threaded shaft disposed adjacent the lever and driven from said motor and a nut movable along the shaft in response to its rotation and adapted to actuate the lever, means for adjustably supporting the switch in predetermined longitudinal relation to the shaft, and means for driving the shaft from said motor in correspondence with the movements of the grips to thereby move the nut along the shaft to actuate the switch in coordinated relation with said movements.

HAROLD E. ENGELBAUGH.
MARTIN S. GETTIG.
CLIFTON R. COBURN.